(12) United States Patent
Hara et al.

(10) Patent No.: US 12,370,945 B2
(45) Date of Patent: Jul. 29, 2025

(54) CONTROL DEVICE, CONTROL METHOD, AND COMPUTER-READABLE RECORDING MEDIUM

(71) Applicant: HONDA MOTOR CO., LTD., Tokyo (JP)

(72) Inventors: Yuki Hara, Tokyo (JP); Tatsuya Watanabe, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 158 days.

(21) Appl. No.: 18/122,368

(22) Filed: Mar. 16, 2023

(65) Prior Publication Data

US 2023/0311760 A1 Oct. 5, 2023

(30) Foreign Application Priority Data

Mar. 30, 2022 (JP) ................................ 2022-056574

(51) Int. Cl.
*B60Q 9/00* (2006.01)
*B60K 31/00* (2006.01)

(52) U.S. Cl.
CPC .......... *B60Q 9/008* (2013.01); *B60K 31/0008* (2013.01)

(58) Field of Classification Search
CPC .......... B60Q 9/00; B60Q 9/005; B60Q 9/006; B60Q 9/008; B60K 31/0008;
(Continued)

(56) References Cited

U.S. PATENT DOCUMENTS 11,130,502 B2 * 9/2021 Reschke ................ B60Q 1/085
2020/0216062 A1 * 7/2020 Hakki .................... B60W 30/09
(Continued)

FOREIGN PATENT DOCUMENTS

| DE | 102020128433 A1 * | 3/2022 | ............. B60T 17/18 |
| WO | WO-2018159429 A1 * | 9/2018 | ............. B60R 21/00 |
| WO | WO-2021049776 A1 * | 3/2021 | ............. B60W 30/08 |

OTHER PUBLICATIONS

Sonar Function, Mar. 25, 2022, retrieved from: https://www.nissan.co.jp/OPTIONAL-PARTS/NAVIOM/SERENA_SPECIAL/PG/c27j1-3e89ebdb-774e-4167-8e6c-4a0658f43581.html.
(Continued)

*Primary Examiner* — Atul Trivedi
(74) *Attorney, Agent, or Firm* — Paratus Law Group, PLLC

(57) ABSTRACT

A control device including circuitry configured to: perform movement control for moving a moving body to a target movement position; detect an obstacle in surroundings of the moving body; and perform notification to a user of the moving body when the obstacle is detected. The movement control is control for moving the moving body at a first speed or less. The circuitry is configured to: stop the notification in response to a notification stop input from the user of the moving body; cancel the stop of the notification when a movement speed of the moving body is equal to or higher than a second speed; and during execution of the movement control, cancel the stop of the notification when a distance between the moving body and the obstacle satisfies a predetermined condition, and continue the stop of the notification when the distance does not satisfy the predetermined condition.

10 Claims, 7 Drawing Sheets

(58) Field of Classification Search
CPC ..... B60W 2050/143; B60W 2050/146; B60W 2554/802; B60W 2554/804; B60W 2520/10; B60W 2520/28; B60W 30/06; B60W 30/095; B60W 50/10; B60W 50/12; B60W 50/14; B60W 60/0011
USPC .......................................................... 701/96
See application file for complete search history.

(56) References Cited

U.S. PATENT DOCUMENTS

| | | | |
|---|---|---|---|
| 2020/0239027 A1* | 7/2020 | Watanabe | B60W 50/14 |
| 2020/0369264 A1* | 11/2020 | Cheon | B60W 30/0953 |
| 2021/0101600 A1* | 4/2021 | Kato | B60Q 1/40 |
| 2021/0103743 A1* | 4/2021 | Park | B60W 30/0956 |
| 2021/0146962 A1* | 5/2021 | Kaji | B60W 30/17 |
| 2021/0261392 A1* | 8/2021 | Theos | G05D 1/224 |
| 2021/0276580 A1* | 9/2021 | Tobe | B60W 50/085 |
| 2021/0291825 A1* | 9/2021 | Goriesky | B60W 60/0011 |
| 2021/0291871 A1* | 9/2021 | Yoshida | B60W 60/0016 |
| 2021/0312193 A1* | 10/2021 | Alpert | H04N 7/183 |
| 2021/0323541 A1* | 10/2021 | Zhu | B60W 60/0059 |
| 2021/0380115 A1* | 12/2021 | Alpert | G06N 3/02 |
| 2022/0017117 A1* | 1/2022 | Yamamoto | G01S 17/87 |
| 2022/0036074 A1* | 2/2022 | Kashimoto | G06V 40/58 |
| 2022/0242442 A1* | 8/2022 | McNeely | B60W 50/14 |
| 2023/0166743 A1* | 6/2023 | Heck | B60W 30/09 |

OTHER PUBLICATIONS

Function of Supporting Safe Driving, Mar. 25, 2022, retrieved from: https://manual.lexus.jp/nx/2110/cv/ja_JP/contents/wvz1609986109329.php.

* cited by examiner

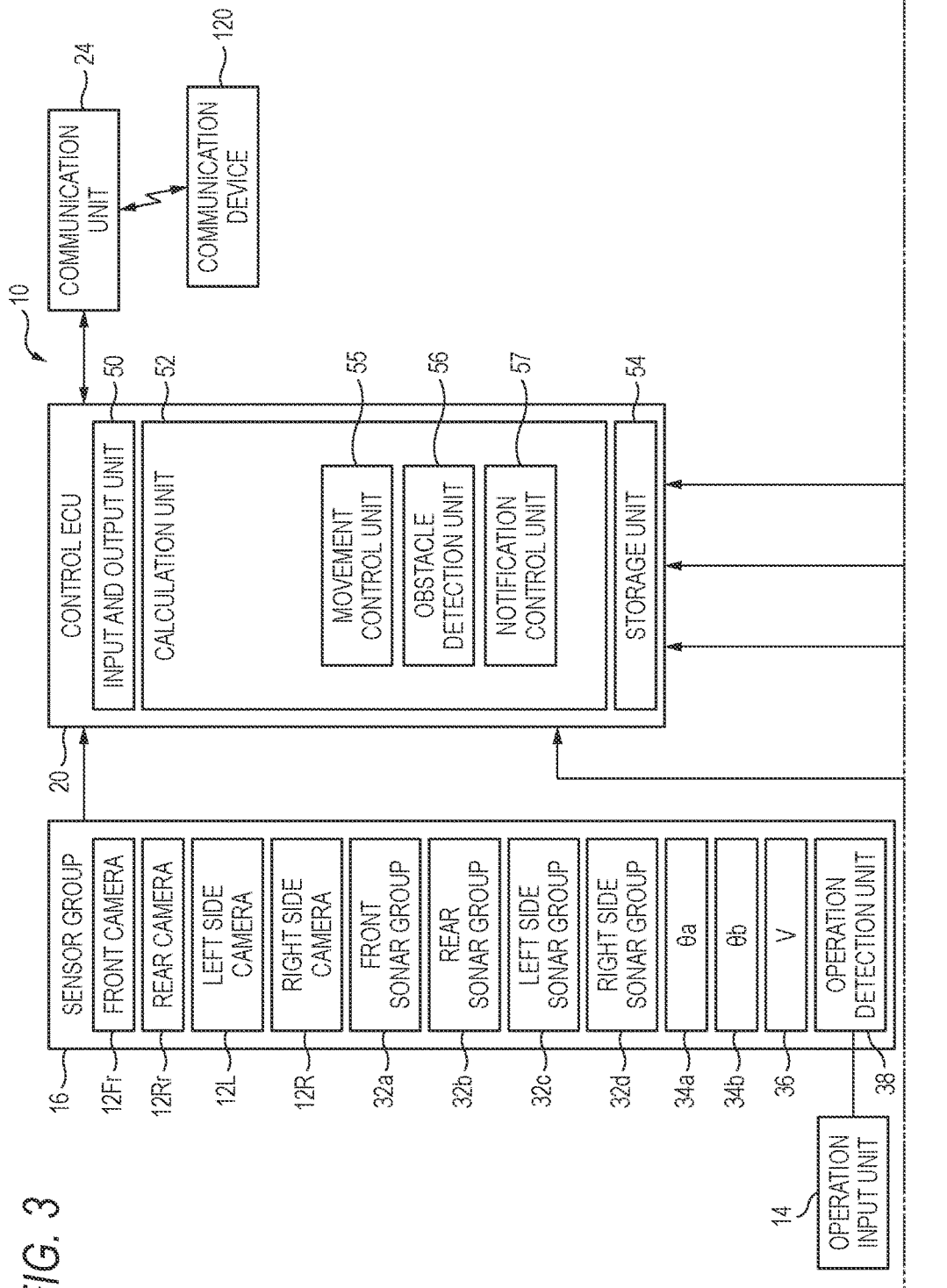

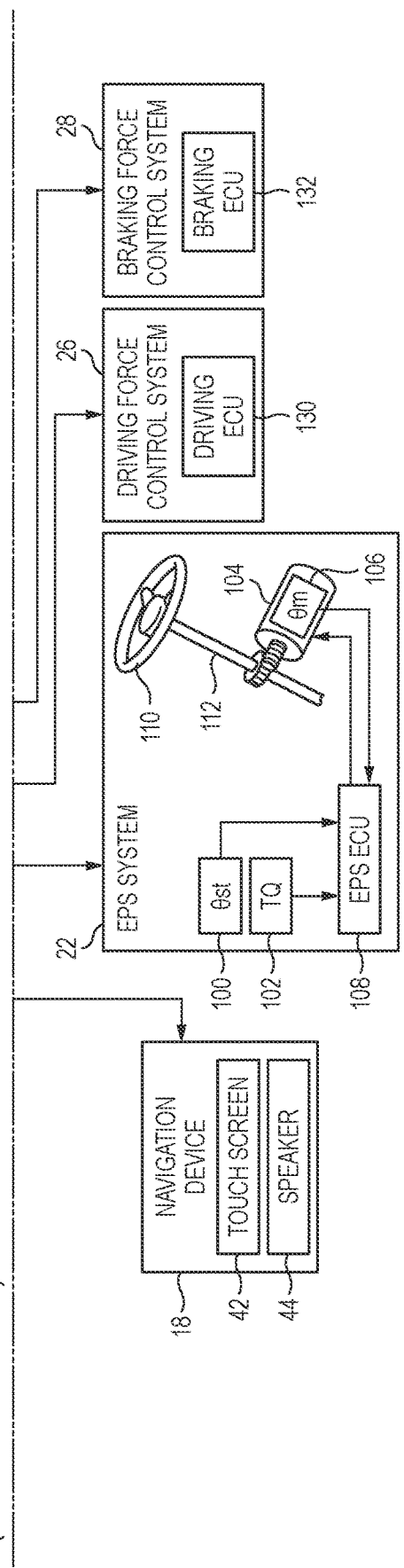

CONTROL DEVICE, CONTROL METHOD, AND COMPUTER-READABLE RECORDING MEDIUM

CROSS-REFERENCE TO RELATED APPLICATIONS

This application is based on and claims priority under 35 USC 119 from Japanese Patent Application No. 2022-056574 filed on Mar. 30, 2022, the contents of which are incorporated herein by reference.

TECHNICAL FIELD

The present disclosure relates to a control device, a control method, and a control program.

BACKGROUND ART

In recent years, efforts have been made to provide access to sustainable transport systems that are considerate of vulnerable people in transport participants. In order to realize the above object, attention is focused on research and development to further improve safety and convenience of traffic through research and development related to autonomous driving technology.

Related art discloses detecting an obstacle by a parking sensor at the time of low speed or parking of a vehicle and notifying a user of a detection result thereof by, for example, a warning sound. Further, related art discloses a function of muting notification of a warning sound even when an obstacle is detected in a case where a predetermined switch operation is performed by a user.

Another related art discloses that notification of a warning sound muted by a switch operation can be canceled by, for example, switching a shift position or causing a vehicle to travel at a predetermined speed or higher.

According to related art, when notification of a warning sound is muted, if a vehicle can travel at a predetermined speed or higher, a mute state thereof can be canceled. However, in a case where a vehicle speed is not normally set to a predetermined speed or higher, such as when the vehicle is parked, for example, the mute state cannot be canceled unless the shift position is switched, and it cannot be said that the mute state is always appropriate for a user in terms of usability. Therefore, in the autonomous driving technology, there is room for improvement in notification of detection of an obstacle when the vehicle is parked while traveling at a low speed.

The present disclosure provides a control device, a control method, and a computer-readable recording medium that stores a control program capable of appropriately canceling stop of notification during movement control of a moving body even when notification of detection of an obstacle is stopped. Further, the present disclosure contributes to development of sustainable transport systems.

SUMMARY

A first aspect of the present disclosure relates to a control device including circuitry configured to:
perform movement control for moving a moving body to a target movement position;
detect an obstacle in surroundings of the moving body; and
perform notification to a user of the moving body when the obstacle is detected, in which
the movement control is control for moving the moving body at a first speed or less, and
the circuitry is configured to:
stop the notification in response to a notification stop input from the user of the moving body;
cancel the stop of the notification when a movement speed of the moving body is equal to or higher than a second speed; and
during execution of the movement control, cancel the stop of the notification when a distance between the moving body and the obstacle satisfies a predetermined condition, and continue the stop of the notification when the distance does not satisfy the predetermined condition.

A second aspect of the present disclosure relates to a control method performed by a processor of a control device, including:
performing movement control for moving a moving body to a target movement position,
detecting an obstacle in surroundings of the moving body.
performing notification to a user of the moving body when the obstacle is detected, in which
the movement control is control for moving the moving body at a first speed or less, and
the control method further includes:
stopping the notification in response to a notification stop input from the user of the moving body;
canceling the stop of the notification when a movement speed of the moving body is equal to or higher than a second speed; and
during execution of the movement control, canceling the stop of the notification when a distance between the moving body and the obstacle satisfies a predetermined condition, and continuing the stop of the notification when the distance does not satisfy the predetermined condition.

A third aspect of the present disclosure relates to a non-transitory computer-readable recording medium that stores a control program for causing a processor of a control device to execute a process, the process including:
performing movement control for moving a moving body to a target movement position,
detecting an obstacle in surroundings of the moving body,
performing notification to a user of the moving body when the obstacle is detected, in which
the movement control is control for moving the moving body at a first speed or less, and
the process further includes:
stopping the notification in response to a notification stop input from the user of the moving body;
canceling the stop of the notification w % ben a movement speed of the moving body is equal to or higher than a second speed; and
during execution of the movement control, canceling the stop of the notification when a distance between the moving body and the obstacle satisfies a predetermined condition, and continuing the stop of the notification when the distance does not satisfy the predetermined condition.

According to the present disclosure, it is possible to provide a control device, a control method, and a computer-readable recording medium that stores a control program capable of appropriately canceling stop of notification during movement control of a moving body even when notification of detection of an obstacle is stopped.

BRIEF DESCRIPTION OF DRAWINGS

Exemplary embodiment(s) of the present disclosure will be described in detail based on the following figures, wherein:

FIG. 3 is a block diagram showing an internal configuration of the vehicle shown in FIG. 1;

DESCRIPTION OF EMBODIMENTS

Figure 1:
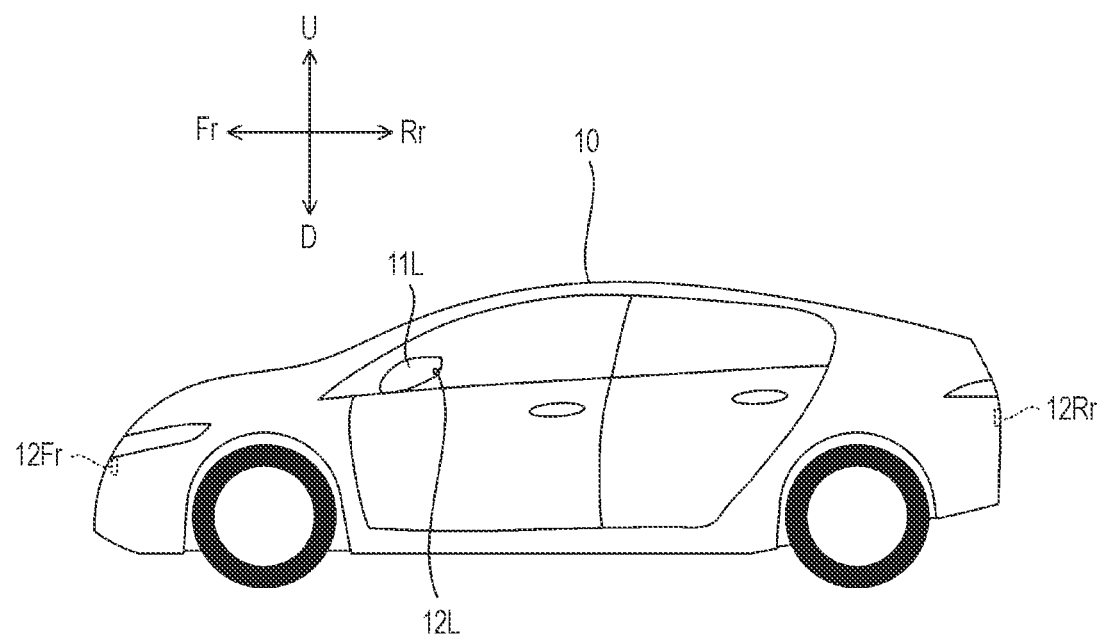
FIG. 1 is a side view showing an example of a vehicle whose movement is controlled by a control device according to the present embodiment.

Hereinafter, an embodiment of a control device, a control method, and a computer-readable recording medium that stores a control program according to the present disclosure will be described with reference to the accompanying drawings. It should be noted that the drawings are viewed in directions of reference numerals. In addition, in the present specification and the like, in order to simplify and clarify the description, a front-rear direction, a left-right direction, and an upper-lower direction are described according to directions viewed from a driver of a vehicle 10 shown in FIGS. 1 and 2. In the drawings, a front side of the vehicle 10 is denoted by Fr, a rear side thereof is denoted by Rr, a left side thereof is denoted by L, a right side thereof is denoted by R, an upper side thereof is denoted by U, and a lower side thereof is denoted by D.

<Vehicle 10 Whose Movement is Controlled by Control Device of Present Disclosure>

Figure 2:
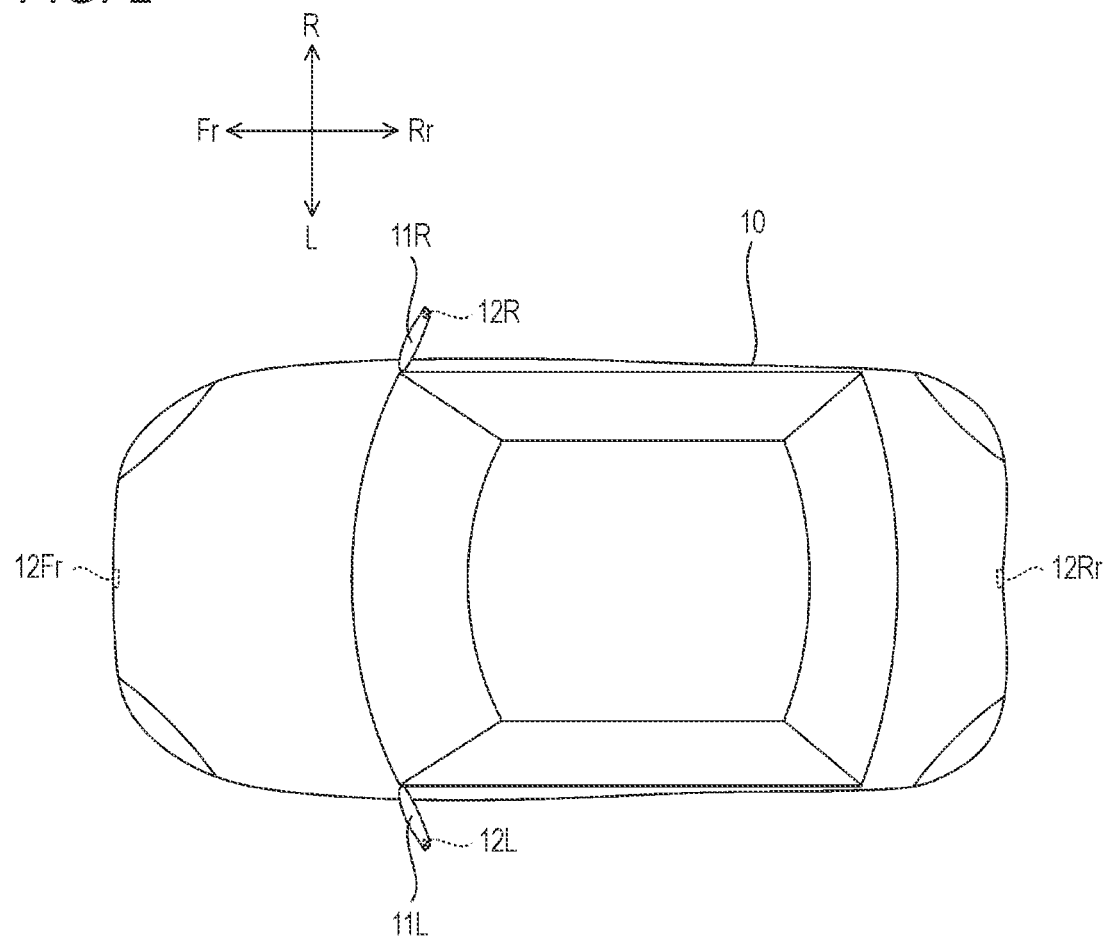
FIG. 2 is a top view of the vehicle shown in FIG. 1.

FIG. 1 is a side view of the vehicle 10 whose movement is controlled by the control device of the present disclosure. FIG. 2 is a top view of the vehicle 10 shown in FIG. 1. The vehicle 10 is an example of a moving object of the present disclosure.

The vehicle 10 is an automobile including a drive source (not shown) and wheels including driving wheels driven by power of the drive source and steerable steering wheels. In the present embodiment, the vehicle 10 is a four-wheeled automobile including a pair of left and right front wheels and a pair of left and right rear wheels. The drive source of the vehicle 10 is, for example, an electric motor. The drive source of the vehicle 10 may also be an internal combustion engine such as a gasoline engine or a diesel engine, or a combination of an electric motor and an internal combustion engine. In addition, the drive source of the vehicle 10 may drive the pair of left and right front wheels, may drive the pair of left and right rear wheels, or may drive four wheels, that is, the pair of left and right front wheels and the pair of left and right rear wheels. The front wheels and the rear wheels may both be the steerable steering wheels, or the front wheels or the rear wheels may be the steerable steering wheels.

The vehicle 10 further includes side mirrors 11L and 11R. The side mirrors 11L and 11R are mirrors (rearview mirrors) that are provided outside front seat doors of the vehicle 10 for a driver to check the rear side and a rear lateral side. Each of the side mirrors 11L and 11R is fixed to a body of the vehicle 10 by a rotation shaft extending in a vertical direction, and can be opened and closed by rotating about the rotation shaft.

The vehicle 10 further includes a front camera 12Fr, a rear camera 12Rr, a left side camera 12L, and a right side camera 12R. The front camera 12Fr is a digital camera that is provided at a front portion of the vehicle 10 and captures an image of the front side of the vehicle 10. The rear camera 12Rr is a digital camera that is provided at a rear portion of the vehicle 10 and captures an image of the rear side of the vehicle 10. The left side camera 12L is a digital camera that is provided on the left side mirror 11L of the vehicle 10 and captures an image of the left side of the vehicle 10. The right side camera 12R is a digital camera that is provided on the right side mirror 11R of the vehicle 10 and captures an image of the right side of the vehicle 10.

<Internal Configuration of Vehicle 10>

FIG. 3 is a block diagram showing an example of an internal configuration of the vehicle 10 shown in FIG. 1. As shown in FIG. 3, the vehicle 10 includes a sensor group 16, a navigation device 18, a control electronic control unit (ECU) 20, an electric power steering (EPS) system 22, and a communication unit 24. The vehicle 10 further includes a driving force control system 26 and a braking force control system 28.

The sensor group 16 obtains various detection values used for control performed by the control ECU 20. The sensor group 16 includes the front camera 12Fr, the rear camera 12Rr, the left side camera 12L, and the right side camera 12R. The sensor group 16 includes a front sonar group 32a, a rear sonar group 32b, a left side sonar group 32c, and a right side sonar group 32d. The sensor group 16 includes wheel sensors 34a and 34b, a vehicle speed sensor 36, and an operation detection unit 38. The sensor group 16 may include a radar.

The front camera 12Fr, the rear camera 12Rr, the left side camera 12L, and the right side camera 12R obtain recognition data (for example, an external environment recognition image) for recognizing surroundings of the vehicle 10 by capturing images of the surroundings of the vehicle 10. An external environment recognition image captured by the front camera 12Fr is referred to as a front recognition image. An external environment recognition image captured by the rear camera 12Rr is referred to as a rear recognition image. An external environment recognition image captured by the left side camera 12L is referred to as a left side recognition image. An external environment recognition image captured by the right side camera 12R is referred to as a right side recognition image. An image formed by the left side recognition image and the right side recognition image may be referred to as a side recognition image. An external environment recognition image generated by synthesizing imaging data of the front camera 12Fr, the rear camera 12Rr, the left side camera 12L, and the right side camera 12R may be referred to as a top view image of the vehicle 10.

The front sonar group 32a, the rear sonar group 32b, the left side sonar group 32c, and the right side sonar group 32d emit sound waves to the surroundings of the vehicle 10 and receive reflected sounds from other objects. The front sonar group 32a includes, for example, four sonars. The sonars constituting the front sonar group 32a are provided on an obliquely left front side, a front left side, a front right side, and an obliquely right front side of the vehicle 10, respectively. The rear sonar group 32b includes, for example, four sonars. The sonars constituting the rear sonar group 32b are provided on an obliquely left rear side, a rear left side, a rear right side, and an obliquely right rear side of the vehicle 10, respectively. The left side sonar group 32c includes, for example, two sonars. The sonars constituting the left side sonar group 32c are provided on a front side and a rear side of a left side portion of the vehicle 10, respectively. The right sonar group 32d includes, for example, two sonars. The sonars constituting the right side sonar group 32d are provided on a front side and a rear side of a right side portion of the vehicle 10, respectively. The front sonar group 32a, the rear sonar group 32b, the left side sonar group 32c, and the right side sonar group 32d obtain detection data (for example, obstacle information) for detecting an obstacle in the surroundings of the vehicle 10.

The wheel sensors 34a and 34b detect rotation angles of the wheels of the vehicle 10. The wheel sensors 34a and 34b may be configured with angle sensors or displacement sensors. The wheel sensors 34a and 34b output detection pulses each time the wheels rotate by predetermined angles. The detection pulses output from the wheel sensors 34a and 34b are used to calculate the rotation angles of the wheels and rotation speeds of the wheels. A movement distance of the vehicle 10 is calculated based on the rotation angles of the wheels. The wheel sensor 34a detects, for example, a rotation angle θa of the left rear wheel. The wheel sensor 34b detects, for example, a rotation angle θb of the right rear wheel.

The vehicle speed sensor 36 detects a speed of a vehicle body of the vehicle 10, that is, a vehicle speed V, and outputs the detected vehicle speed V to the control ECU 20. The vehicle speed sensor 36 detects the vehicle speed V based on, for example, rotation of a transmission countershaft.

The operation detection unit 38 detects an operation content performed by a user using an operation input unit 14, and outputs the detected operation content to the control ECU 20. The operation input unit 14 includes, for example, various user interfaces such as a side mirror switch for switching between an opened state and a closed state of the side mirrors 11L and 11R, and a shift lever (a select lever or a selector).

The navigation device 18 detects a current position of the vehicle 10 by using, for example, a global positioning system (GPS), and guides the user to a route to a destination. The navigation device 18 includes a storage device (not shown) that includes a map information database.

The navigation device 18 includes a touch screen 42 and a speaker 44. The touch screen 42 functions as an input device and a display device of the control ECU 20. The speaker 44 outputs various types of guide information to the user of the vehicle 10 by audio.

The touch screen 42 is configured to input various commands to the control ECU 20. For example, the user can input a command related to movement assistance of the vehicle 10 via the touch screen 42. The movement assistance includes parking assistance and exit assistance of the vehicle 10. The touch screen 42 is configured to display various screens related to a control content of the control ECU 20. For example, a screen related to the movement assistance of the vehicle 10 is displayed on the touch screen 42. Specifically, a parking assistance button for requesting the parking assistance of the vehicle 10 and an exit assistance button for requesting the exit assistance are displayed on the touch screen 42. The parking assistance button includes an autonomous parking button for requesting parking by autonomous steering of the control ECU 20 and a guidance parking button for requesting guidance when parking the vehicle by an operation of the driver. The exit assistance button includes an autonomous exit button for requesting exit by the autonomous steering of the control ECU 20 and a guidance exit button for requesting guidance when the exit of the vehicle is performed by an operation of the driver. The touch screen 42 displays the external environment recognition image for recognizing the surroundings of the vehicle 10. Constituent elements other than the touch screen 42, for example, a head-up display (HUD), a smartphone, or a tablet terminal may be used as the input device or the display device.

The control ECU 20 includes an input and output unit 50, a calculation unit 52, and a storage unit 54. The calculation unit 52 is implemented by, for example, a central processing unit (CPU). The calculation unit 52 performs various types of control by controlling each unit based on a program stored in the storage unit 54. Further, the calculation unit 52 inputs and outputs a signal from and to units connected to the control ECU 20 via the input and output unit 50.

The calculation unit 52 includes a movement control unit 55 for controlling the movement of the vehicle 10, an obstacle detection unit 56 for detecting an obstacle in the surroundings of the vehicle 10, and a notification control unit 57 for notifying a user of the vehicle 10 that the obstacle is detected. The calculation unit 52 is an example of the control device of the present disclosure. The obstacle detection unit 56 is an example of a detection unit of the present disclosure.

The movement control unit 55 performs autonomous parking assistance and autonomous exit assistance on the vehicle 10 by autonomous steering in which a steering 110 is autonomously operated under control of the movement control unit 55. In the autonomous parking assistance and the autonomous exit assistance, an accelerator pedal (not shown), a brake pedal (not shown), and the operation input unit 14 are autonomously operated. Further, the movement control unit 55 performs guidance parking assistance and guidance exit assistance when the driver operates the accelerator pedal, the brake pedal, and the operation input unit 14 to perform manual parking and manual exit of the vehicle 10.

For example, the movement control unit 55 performs movement control for moving the vehicle 10 to a target movement position. The movement control includes, for example, autonomous parking control for autonomously parking the vehicle 10, autonomous exit control for performing autonomous exit of the vehicle 10, guidance parking control for performing guidance parking of the vehicle 10, guidance exit control for performing guidance exit of the vehicle 10, and the like. The target movement position includes a specific parking space where the vehicle 10 is parked, a specific exit position where the vehicle 10 exits, and the like. The movement control is control for moving the vehicle 10 at a first speed (for example, 15 km/h) or less. Therefore, for example, when performing the autonomous parking control and the autonomous exit control of the vehicle 10, the movement control unit 55 performs control to move the vehicle 10 at the first speed or less.

For example, based on the recognition data of the external environment of the vehicle 10 obtained by the front camera 12Fr, the rear camera 12Rr, the left side camera 12L, and the right side camera 12R and a parking space designated by the user, the movement control unit 55 performs autonomous parking control for autonomously parking the vehicle 10 in a predetermined parking space and exit execution control for causing the vehicle 10 to autonomously exit from the predetermined parking space to a predetermined exit position. The movement control unit 55 executes the autonomous parking control and the autonomous exit control in accordance with an instruction signal based on the operation of the autonomous parking button and the autonomous exit button of the touch screen 42 or an instruction signal input from the outside via the input and output unit 50. The input from the outside includes, for example, an input through wireless communication from an information terminal or the like carried by the user of the vehicle 10. That is, an instruction signal input when the user remotely performs the movement control of the vehicle 10 while performing wireless communication with the vehicle 10 using the information terminal from the outside of the vehicle 10 is also included.

The obstacle detection unit 56 obtains, from each sonar, obstacle information representing a detection result of an obstacle in the surroundings of the vehicle 10 detected by the front sonar group 32a, the rear sonar group 32b, the left side sonar group 32c, and the right side sonar group 32d. For example, the obstacle detection unit 56 obtains, from each sonar, obstacle information representing a detection result of an obstacle detected in the surroundings of the vehicle 10 when the vehicle 10 is parked or exits a parking space. Examples of the obstacle include an object that can interfere with traveling of the vehicle 10, such as a person, an animal, another vehicle, and a planting. In addition, the detection device that detects the obstacle in the surroundings of the vehicle 10 may be, for example, a LiDAR, a radar, or the cameras 12Fr, 12Rr, 12L, and 12R in addition to the sonars.

When an obstacle is detected by the obstacle detection unit 56, the notification control unit 57 notifies the user of the vehicle 10 that the obstacle is detected. The notification control unit 57 can notify, for example, by audio output or visual display, the user that the obstacle is detected.

When receiving a notification stop input for stopping the notification regarding the detection of the obstacle from the user of the vehicle 10, the notification control unit 57 stops the notification. The stop of notification refers to a state in which an obstacle is detected but the user is not notified of the detection result, for example, a notification mute state. The notification stop input includes, for example, an operation input to the touch screen 42 and an operation input to an information terminal carried by the user. The case where the notification stop input is performed includes, for example, a case where a user who feels continuous notification annoying stops the notification, a case where a user who predicts that the notification is likely to be performed stops the notification in advance, and the like. When receiving the notification stop input, the notification control unit 57 may stop only the audio notification of the audio notification and the visual notification, or may stop both the audio notification and the visual notification. For example, in a case where receiving the notification stop input, the audio notification and the visual notification may be stopped when a distance between the vehicle 10 and the obstacle is greater than a certain distance, and only the audio notification may be stopped when the distance between the vehicle 10 and the obstacle is equal to or shorter than the certain distance. The certain distance is, for example, about 10 m.

In a case where the notification regarding the detection of the obstacle is stopped, when a movement speed of the vehicle 10 is equal to or higher than a second speed, the notification control unit 57 cancels the stop of the notification. The second speed is higher than the first speed of the vehicle 10 under the movement control of the movement control unit 55. The second speed is, for example, 30 km/h. In addition, the notification control unit 57 cancels the stop of the notification when a traveling direction of the vehicle 10 is switched, or when a notification stop cancellation input is received from the user of the vehicle 10 in a state in which the notification regarding the detection of the obstacle is stopped. The switching of the traveling direction includes, for example, a change in behavior due to the switching of a shift position of the vehicle 10. The notification stop cancellation input is an input operation for canceling a state in which notification regarding detection of an obstacle is stopped, and includes, for example, an operation input to the touch screen 42, an operation input to an information terminal carried by the user, and the like. In this case, the notification control unit 57 cancels the stop of the notification even when the vehicle 10 is under movement control or during normal traveling.

In a case where the notification regarding the detection of the obstacle is stopped and the movement control is being executed by the movement control unit 55, the notification control unit 57 cancels the stop of the notification when the distance between the vehicle 10 and the obstacle is equal to or less than a predetermined distance. Further, in a case where the notification regarding the detection of the obstacle is stopped and the movement control is being executed by the movement control unit 55, the notification control unit 57 continues to stop the notification when the distance between the vehicle 10 and the obstacle is greater than the predetermined distance. The predetermined distance between the vehicle 10 and the obstacle is, for example, 1 m to 2 m.

On the other hand, in a case where the notification regarding the detection of the obstacle is stopped and the movement control is not executed by the movement control unit 55, the notification control unit 57 does not cancel the stop of the notification even when the distance between the vehicle 10 and the obstacle is equal to or less than the predetermined distance. That is, in a case where the vehicle 10 is traveling normally, the notification control unit 57 does not cancel the stop of the notification even when the distance between the vehicle 10 and the obstacle becomes short. For example, in a case where the vehicle 10 normally travels on a narrow road at the first speed (15 km/h) or less, in a case where the vehicle 10 travels at the first speed (15 km/h) or less during drive-through, or the like, the notification control unit 57 does not cancel the stop of the notification even when the distance between the vehicle 10 and the detected obstacle becomes 1 m to 2 m or less.

In a case where the notification regarding the detection of the obstacle is stopped and the movement control is being executed by the movement control unit 55, the notification control unit 57 cancels the stop of the notification based on an amount of change in the distance between the vehicle 10 and the obstacle. For example, the notification control unit 57 predicts a future distance between the vehicle 10 and the obstacle based on the amount of change in the distance, and cancels the stop of the notification when the predicted distance is equal to or less than a threshold value. Specifically, the notification control unit 57 cancels the stop of the notification when it is predicted that there is a possibility that the vehicle 10 will collide, or when it is predicted that the vehicle 10 will approach the obstacle within the predetermined distance. The notification control unit 57 may determine the possibility of approaching the obstacle based on a movement trajectory of the vehicle 10 and a movement trajectory of the obstacle, and may cancel the stop of the notification when there is the possibility of approaching the obstacle. In this case, the notification control unit 57 may cancel the stop of the notification regardless of a current separation distance between the vehicle 10 and the obstacle.

For example, when the movement control is executed by the movement control unit 55, in response to the notification regarding the detection of the obstacle, the notification control unit 57 receives the notification stop input from the user of the vehicle 10, and does not stop the notification when the distance between the vehicle 10 and the obstacle is equal to or less than the predetermined distance. That is, in a case where the distance between the vehicle 10 and the obstacle is already equal to or less than the predetermined distance when receiving the notification stop input from the user, the notification control unit 57 does not cancel the stop after stopping the notification, but does not stop the notification in the first place. In this case, the notification control unit 57 may cause the user to know why not to stop the notification.

For example, before the movement control is executed by the movement control unit 55, in response to the notification regarding the detection of the obstacle, the notification control unit 57 receives the notification stop input and stops the notification. Thereafter, when the movement control is executed by the movement control unit 55 and the distance between the vehicle 10 and the obstacle becomes equal to or less than the predetermined distance, the notification control unit 57 cancels the stop of the notification. The notification stop input before the movement control is executed includes, for example, an operation of a notification stop input previously performed by the user by predicting that notification related to an obstacle is likely to be made when the user intends to perform the autonomous parking control or the autonomous exit control from this time, an operation of a notification stop input performed by the user in response to notification regarding detection of an obstacle during normal traveling, and the like.

The EPS system 22 includes a steering angle sensor 100, a torque sensor 102, an EPS motor 104, a resolver 106, and an EPS ECU 108. The steering angle sensor 100 detects a steering angle θst of the steering 110. The torque sensor 102 detects a torque TQ applied to the steering 110.

The EPS motor 104 applies a driving force or a reaction force to a steering column 112 connected to the steering 110, thereby enabling assistance of an operation performed by an occupant on the steering 110 and enabling the autonomous steering during the parking assistance. The resolver 106 detects a rotation angle θm of the EPS motor 104. The EPS ECU 108 controls the entire EPS system 22. The EPS ECU 108 includes an input and output unit (not shown), a calculation unit (not shown), and a storage unit (not shown).

The communication unit 24 enables wireless communication with the other communication device 120. The other communication device 120 is a base station, a communication device of another vehicle, an information terminal such as a smartphone or a tablet terminal carried by the user of the vehicle 10, or the like.

The driving force control system 26 includes a driving ECU 130. The driving force control system 26 executes driving force control on the vehicle 10. The driving ECU 130 controls a driving force of the vehicle 10 by controlling an engine (not shown) or the like based on an operation performed by the user on the accelerator pedal (not shown).

The braking force control system 28 includes a braking ECU 132. The braking force control system 28 executes braking force control on the vehicle 10. The braking ECU 132 controls a braking force of the vehicle 10 by controlling a brake mechanism (not shown) or the like based on an operation performed by the user on the brake pedal (not shown).

<Example of Situation in which Notification Regarding Detection of Obstacle is Issued>

Next, an example of a situation in which notification regarding detection of an obstacle is issued during movement control of the vehicle 10 will be described with reference to FIGS. 4 and 5.

Figure 4:
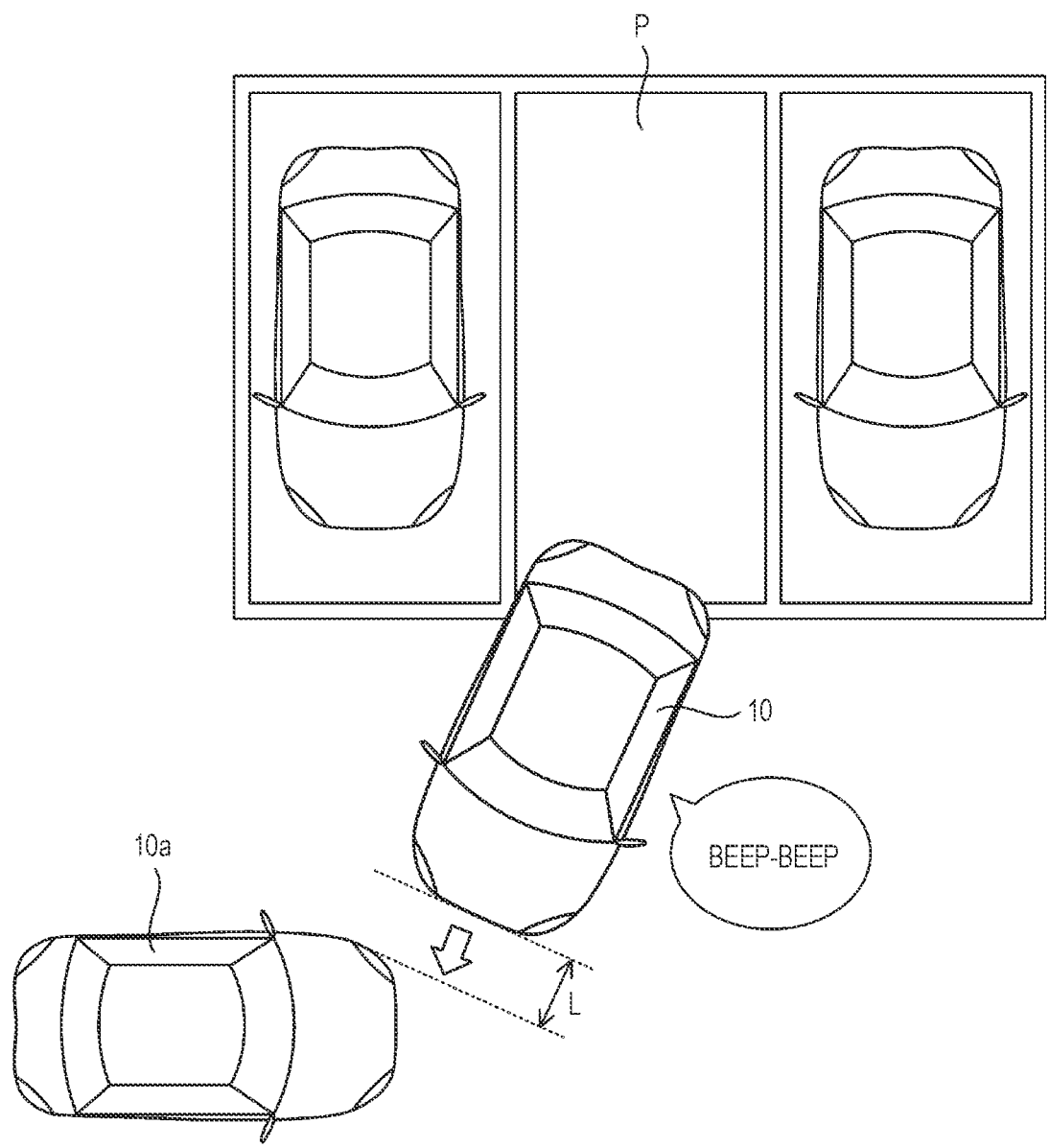
FIG. 4 shows an example of a situation in which the vehicle is controlled to autonomously exit by forward exit.

FIG. 4 shows an example of a situation in which the vehicle 10 is controlled to autonomously exit a parking space P by forward exit. It is assumed that the autonomous exit in the example illustrated in the figure is an autonomous exit in a state in which the user (the driver) is riding in the vehicle 10. Further, in the autonomous exit, it is assumed that the autonomous exit button of the touch screen 42 is turned on by the user and an exit in a forward right direction is selected.

As shown in FIG. 4, the movement control unit 55 starts the autonomous exit control for moving the vehicle 10 from the parking space P toward the right front. When an obstacle is detected by the sonar groups 32*a* to 32*d*, the notification control unit 57 performs, for example, audio notification and visual notification for notifying that the obstacle is detected. For example, the audio notification is output via the speaker 44 of the navigation device 18. The visual notification is displayed on the touch screen 42 of the navigation device 18 by an indicator. In response to the notification, for example, when the user performs an input operation of stopping the notification on the touch screen 42, the notification control unit 57 stops the audio notification of the audio notification and the visual notification, for example. During the execution of the continued autonomous exit control, the notification control unit 57 cancels the stop of the notification when the distance between the vehicle 10 and the obstacle nearly becomes, for example, within 1 m, and continues the stop of the notification when the distance between the vehicle 10 and the obstacle is greater than 1 m. For example, as shown in FIG. 4, when a distance L between another vehicle 10*a*, which is an obstacle of the vehicle 10, and the vehicle 10 nearly becomes within 1 m, the notification control unit 57 cancels the stop of the notification and performs audio notification such as "beep-beep" together with the visual notification by indicator display. The visual notification by the indicator display will be described later with reference to FIG. 6.

Figure 5:
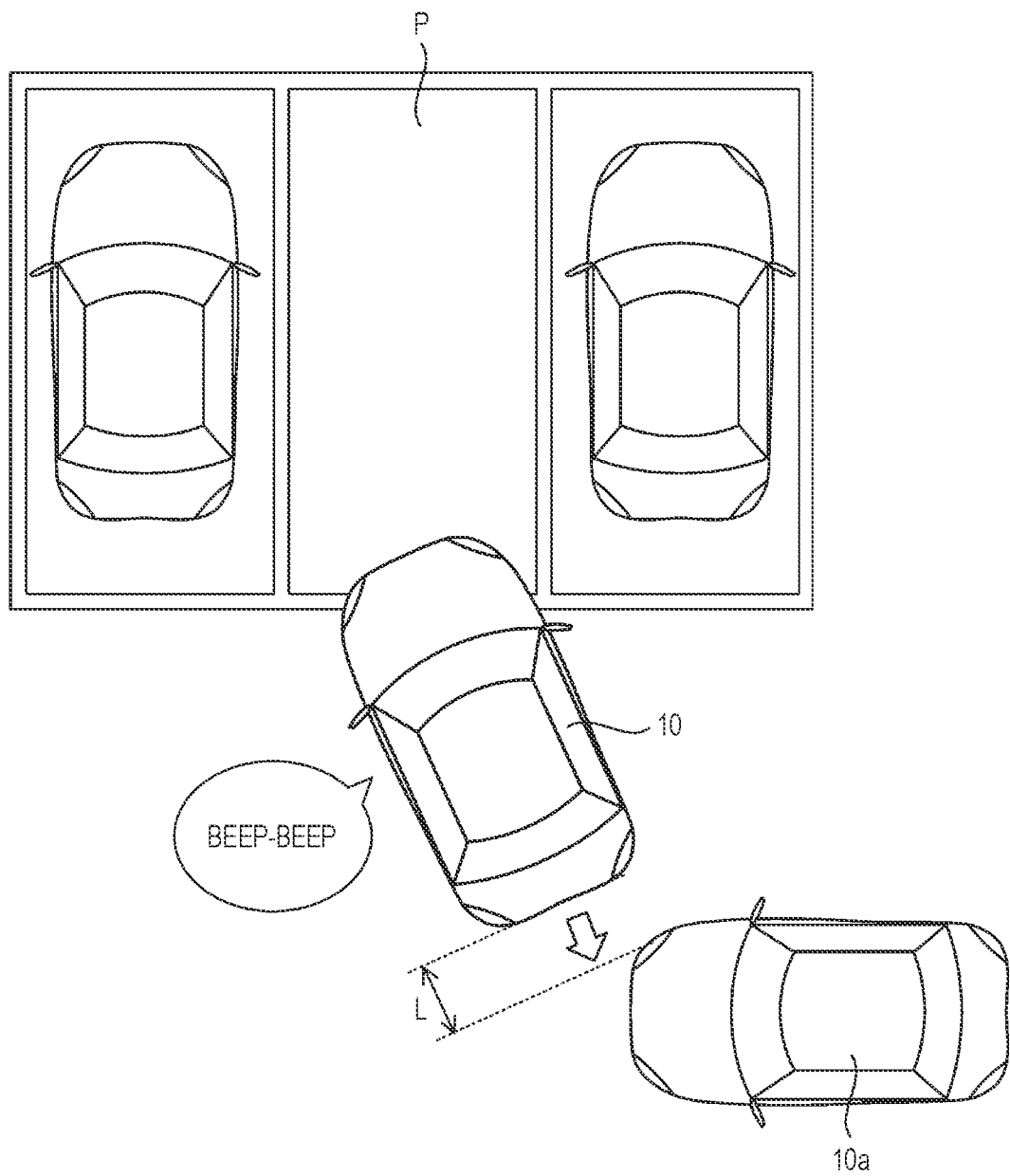
FIG. 5 shows an example of a situation in which the vehicle is controlled to autonomously exit by reverse exit.

FIG. 5 shows an example of a situation in which the vehicle 10 is controlled to autonomously exit the parking space P by reverse exit. It is assumed that the autonomous exit in the example illustrated in the figure is a state in which the user (the driver) is still riding, as in the case of the forward exit in FIG. 4. Further, in the autonomous exit, it is assumed that the autonomous exit button of the touch screen 42 is turned on by the user and an exit in a reverse right direction is selected.

As shown in FIG. 5, the movement control unit 55 starts the autonomous exit control for moving the vehicle 10 from the parking space P toward the right rear. As in the case of FIG. 4, when an obstacle is detected, the notification control unit 57 performs audio notification and visual notification. In addition, the notification control unit 57 stops the audio notification when receiving an input operation of stopping the notification in response to the notification. During the execution of the autonomous exit control, the notification control unit 57 cancels the stop of the notification when the distance between the vehicle 10 and the obstacle nearly becomes, for example, within 1 m, and continues the stop of the notification when the distance between the vehicle 10 and the obstacle is greater than 1 m. For example, as shown in FIG. 5, when the distance L between another vehicle 10*a*, which is the obstacle of the vehicle 10, and the vehicle 10 nearly becomes within 1 m, the notification control unit 57 cancels the stop of the notification and performs the audio notification together with the visual notification.

In the autonomous exit control shown in FIGS. 4 and 5, the case where the user is riding in the vehicle 10 has been described, but the present invention is not limited thereto. For example, the present invention is similarly applicable to a case where the user is present outside the vehicle 10 and performs remote autonomous exit control using an information terminal. In the case of remote autonomous exit control, the audio notification and the visual notification are issued from a speaker and a terminal screen of the information terminal.

<Visual Notification Example Regarding Detection of Obstacle>

Figure 6:
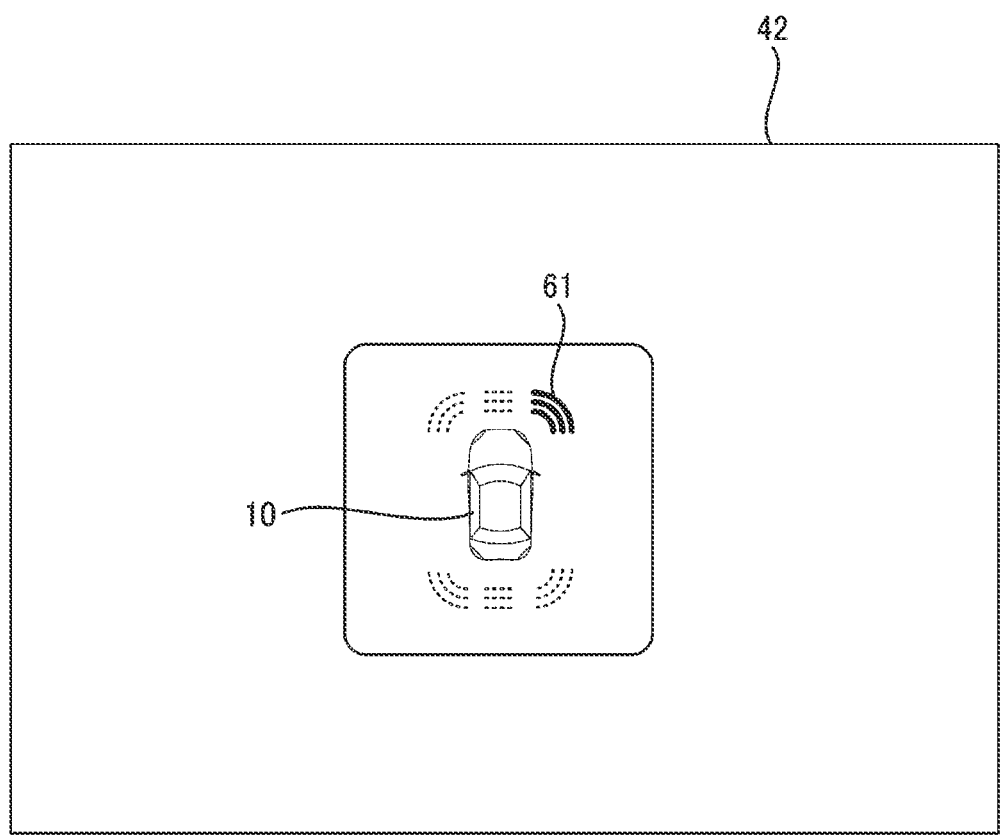
FIG. 6 shows a situation in which a warning indicating that an obstacle is detected is displayed by an indicator.

Next, an example of visual notification regarding detection of an obstacle will be described with reference to FIG. 6. FIG. 6 shows a situation in which a warning indicating that an obstacle is detected in the surroundings of the vehicle is displayed on the touch screen 42 of the navigation device 18 by an indicator. In the example illustrated in the figure, a right front side where the obstacle is detected is displayed in a specific color as a detection place (a direction) 61. Accordingly, the user can recognize that the obstacle is present on the right front side of the vehicle 10 by viewing the touch screen 42.

<Example of Processing by Calculation Unit 52>

Figure 7:
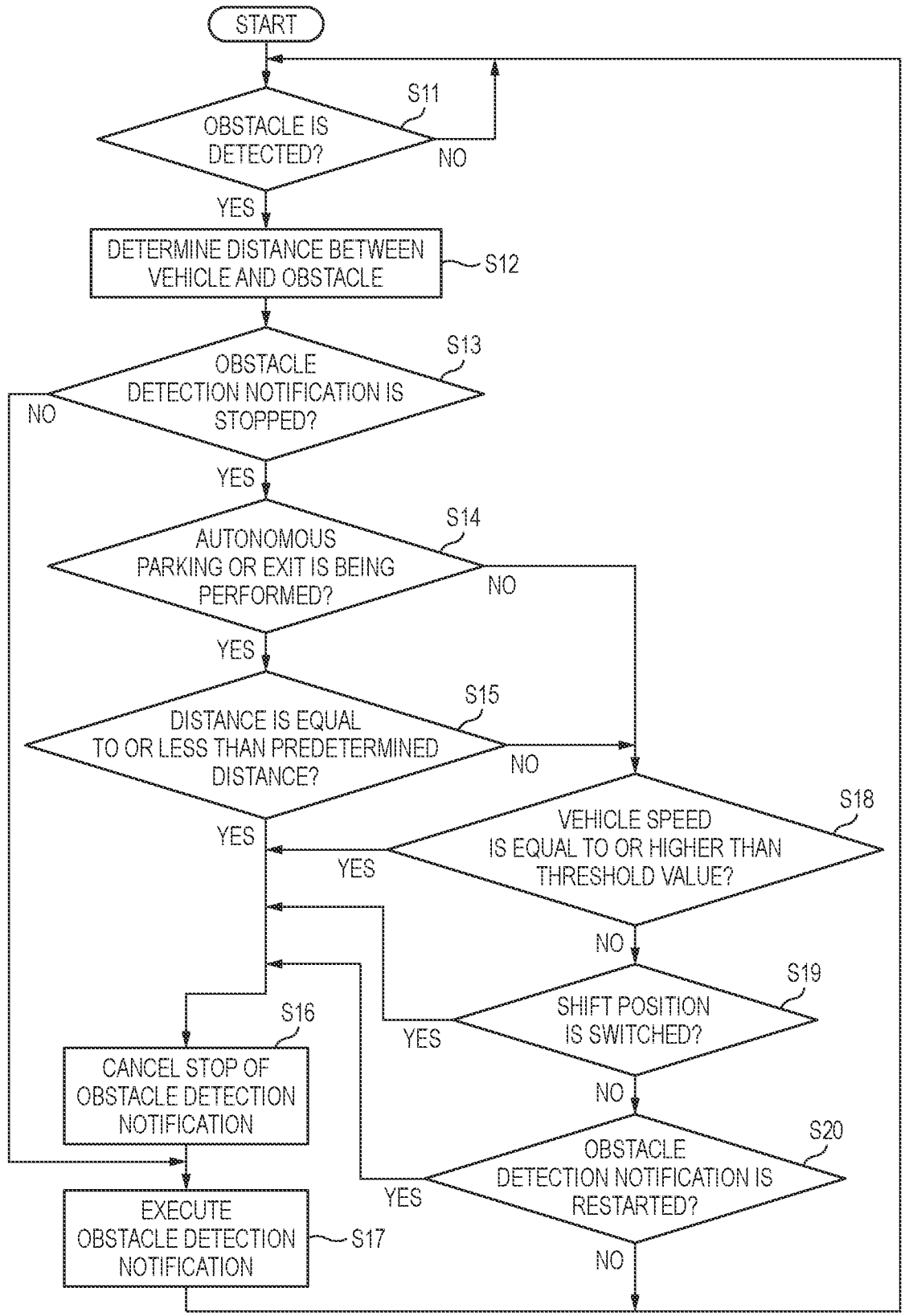
FIG. 7 is a flowchart showing an example of processing performed by a calculation unit at the time of autonomous parking and at the time of autonomous exit.

Next, an example of processing of notification to the user at the time of autonomous parking and autonomous exit and processing of stopping the notification and canceling the stop by the calculation unit 52 of the vehicle 10 will be described with reference to a flowchart shown in FIG. 7. The processing shown in FIG. 7 is repeatedly executed when the vehicle 10 travels.

The obstacle detection unit 56 of the calculation unit 52 determines whether an obstacle is detected in the surroundings of the vehicle 10 (step S11). As described above, the obstacle in the surroundings of the vehicle 10 can be detected based on the obstacle information obtained by the sonar groups 32a to 32d.

In step S11, when no obstacle is detected in the surroundings of the vehicle 10 (step S11: No), the obstacle detection unit 56 repeats the processing of step S11 until an obstacle is detected.

In step S11, when an obstacle is detected in the surroundings of the vehicle 10 (step S11: Yes), the obstacle detection unit 56 determines a distance between the vehicle 10 and the detected obstacle based on the obstacle information obtained by the sonar groups 32a to 32d (step S12).

Next, the notification control unit 57 of the calculation unit 52 determines whether obstacle detection notification for causing the user to know that the obstacle is detected is stopped (step S13). As described above, the stop of the obstacle detection notification can be executed, for example, by the operation of the notification stop input to the touch screen 42 by the user (the driver) riding in the vehicle 10.

In step S13, when the obstacle detection notification is stopped, that is, when the obstacle detection notification is stopped by the operation of the notification stop input by the user (step S13: Yes), the notification control unit 57 determines whether the vehicle 10 is currently subjected to the autonomous parking control or the autonomous exit control by the movement control unit 55 (step S14). For example, the notification control unit 57 determines whether the autonomous parking control or the autonomous exit control is being performed based on whether the autonomous parking button or the autonomous exit button is operated.

In step S14, when the autonomous parking control or the autonomous exit control is performed (step S14: Yes), the notification control unit 57 determines whether the distance between the vehicle 10 and the obstacle determined in step S12 is equal to or less than a predetermined distance set in advance (step S15). As described above, the predetermined distance between the vehicle 10 and the obstacle set in advance is, for example, 1 m to 2 m. In the autonomous parking control or the autonomous exit control, the vehicle 10 is controlled to a speed of, for example, 15 km/h (the first speed) or less.

In step S15, when the distance between the vehicle 10 and the obstacle is equal to or less than the predetermined distance, that is, when the obstacle is close to the vehicle 10 (step S15: Yes), the notification control unit 57 cancels the stop of the obstacle detection notification (step S16).

Next, the notification control unit 57 executes the obstacle detection notification to the user of the vehicle 10 (step S17), and returns to step S11 to repeat each processing. The user is notified of the obstacle detection by, for example, a warning sound output from the speaker 44 of the navigation device 18 and a color display of the indicator provided on the touch screen 42.

On the other hand, in step S13, when the obstacle detection notification is not stopped (step S13: No), the notification control unit 57 proceeds to step S17 and executes the obstacle detection notification to the user of the vehicle 10.

On the other hand, in step S14, when the autonomous parking control or the autonomous exit control is not performed (step S14: No), the notification control unit 57 determines whether the current speed of the vehicle 10 is equal to or higher than a preset threshold value (the second speed) (step S18). As described above, the second speed is, for example, 30 km/h.

In step S18, when the vehicle speed is equal to or higher than the threshold value (step S18: Yes), the notification control unit 57 proceeds to step S16 and cancels the stop of the obstacle detection notification.

In step S18, when the vehicle speed is not equal to or higher than the threshold value (step S18: No), the notification control unit 57 determines whether the shift position is switched after the stop of the current obstacle detection notification is started in the vehicle 10 (step S19). For example, the notification control unit 57 determines whether the shift position is switched from forward to reverse or from reverse to forward in order to switch the traveling direction of the vehicle 10.

In step S19, when the shift position is switched (step S19: Yes), the notification control unit 57 proceeds to step S16 and cancels the stop of the obstacle detection notification.

In step S19, when the shift position is not switched (step S19: No), the notification control unit 57 determines whether the obstacle detection notification is restarted, that is, there is a notification stop cancellation input for canceling the state in which the obstacle detection notification is stopped (step S20).

In step S20, when the obstacle detection notification is restarted (step S20: Yes), the notification control unit 57 proceeds to step S16 and cancels the stop of the obstacle detection notification.

In step S20, when the obstacle detection notification is not restarted (step S20: No), the notification control unit 57 returns to step S1 and repeats each processing.

As described above, the notification control unit 57 of the calculation unit 52 of the vehicle 10 stops the notification regarding the detection of the obstacle in response to the notification stop input from the user. In a case where the autonomous exit control is being executed, the notification control unit 57 cancels the stop of the notification when the distance between the vehicle 10 and the obstacle is equal to or less than the predetermined distance, and continues the stop of the notification when the distance between the vehicle 10 and the obstacle is greater than the predetermined distance. Accordingly, even when the notification of the detection of the obstacle is temporarily stopped, the notification can be resumed when the obstacle is in the vicinity of the vehicle 10. Therefore, it is possible to switch between canceling and continuing the stop of the notification according to the distance between the vehicle 10 and the obstacle, so that it is possible to perform appropriate notification. Therefore, it is possible to improve both the safety and usability of the vehicle 10.

When the notification regarding the detection of the obstacle is stopped and the autonomous exit control is being executed, the notification control unit 57 cancels the stop of the notification based on the amount of change in the distance between the vehicle 10 and the obstacle. Accordingly, in a case where it is predicted that the obstacle approaches the vehicle 10 when the current autonomous exit control is continued, it is possible to cancel the stop of the notification, and it is possible to improve the safety and usability of the vehicle 10.

In a state in which the notification regarding the detection of the obstacle is stopped, for example, when the movement speed of the vehicle 10 is equal to or higher than the second speed, when the traveling direction of the vehicle 10 is switched, and when a notification stop cancellation input is received from the user, the notification control unit 57 cancels the stop of the notification. Accordingly, it is possible to cancel the stop of the notification according to a movement state of the vehicle 10 or a change input from the user, and it is possible to improve the safety and usability of the vehicle 10.

Before the autonomous exit control is executed, in response to the notification regarding the detection of the obstacle, the notification control unit 57 receives the notification stop input and stops the notification. Thereafter, when the autonomous exit control is executed and the distance between the vehicle 10 and the obstacle becomes equal to or less than the predetermined distance, the notification control unit 57 cancels the stop of the notification. Accordingly, for example, even in a case where the user predicts the notification of the detection of the obstacle and stops the notification in advance, the stop of the notification is canceled when the distance to the obstacle is equal to or less than the predetermined distance, and thus it is possible to improve the safety and usability of the vehicle 10.

The notification control unit 57 can notify the user that the obstacle is detected by audio notification and visual notification when the obstacle is detected, and stops only the audio notification of the audio notification and the visual notification when receiving a notification stop input. At the time of autonomous exit and autonomous parking, the user often recognizes that the obstacle is present in the surroundings of the vehicle 10. In such a situation, when the notification of the detection of the obstacle is continued, the notification becomes annoying, and thus the notification is to be stopped. Therefore, in a case where the notification stop input is received, when the distance to the obstacle is large, the audio notification is stopped and only the visual notification is performed, and thus it is possible to visually attract the attention of the user while reducing the annoyance of the user due to the audio output.

When the autonomous exit control is being executed, the notification control unit 57 receives the notification stop input from the user in response to the notification regarding the detection of the obstacle and does not stop the notification when the distance between the vehicle 10 and the obstacle is equal to or less than the predetermined distance. Accordingly, when the distance between the vehicle 10 and the obstacle is equal to or less than the predetermined distance, it is possible to prevent the notification from being stopped in the first place rather than canceling the stop after stopping the notification, and thus it is possible to improve the safety and usability of the vehicle 10.

Although the embodiment has been described above, the present invention is not limited to the above embodiment, and modifications, improvements, and the like can be made as appropriate.

For example, although the case where the vehicle 10 exits is described in the above embodiment, the same control can be performed when the vehicle 10 is parked. In addition, the control is not limited to the autonomous exit and the autonomous parking by the autonomous driving, and for example, the same control can be performed in the case of the guidance exit and the guidance parking of the driving assistance or the manual driving.

The control method described in the above embodiment can be implemented by executing a control program prepared in advance on a computer. The control program is recorded in a computer-readable storage medium and is executed by being read from the storage medium. In addition, the control program may be provided in a form of being stored in a non-transitory storage medium such as a flash memory or may be provided via a network such as the Internet. The computer that executes the control program may be provided in a control device, may be provided in an electronic device such as a smartphone, a tablet terminal, or a personal computer capable of communicating with the control device or may be provided in a server device capable of communicating with the control device and the electronic device.

In addition, at least the following matters are described in the present specification. It should be noted that although constituent elements corresponding to those in the above-described embodiments are shown in parentheses, the constituent elements are not limited thereto.

(1) A control device including: a movement control unit (movement control unit 55) configured to perform movement control for moving a moving body (vehicle 10) to a target movement position;
   a detection unit (obstacle detection unit 56) configured to detect an obstacle in surroundings of the moving body; and
   a notification control unit (notification control unit 57) configured to perform notification to a user of the moving body when the obstacle is detected, in which
   the movement control is control for moving the moving body at a first speed or less, and
   the notification control unit is configured to:
     stop the notification in response to a notification stop input from the user of the moving body;
     cancel the stop of the notification when a movement speed of the moving body is equal to or higher than a second speed; and
     during execution of the movement control, cancel the stop of the notification when a distance between the moving body and the obstacle satisfies a predetermined condition, and continue the stop of the notification when the distance does not satisfy the predetermined condition.

According to (1), even during the movement control in which the stop of the notification is not canceled based on the movement speed, it is possible to perform appropriate notification according to the distance between the moving body and the obstacle, and it is possible to improve both the safety and usability of the vehicle by appropriately switching between canceling and continuing the stop of the notification.

(2) The control device according to (1), in which
the predetermined condition is that the distance is equal to or less than a predetermined distance.

According to (2), when the obstacle is in the vicinity of the moving body, the notification can be performed, and the safety of the moving body can be improved.

(3) The control device according to (1), in which
the predetermined condition is a condition based on an amount of change in the distance.

According to (3), when it is predicted that the obstacle approaches the moving body in the future, it is possible to cancel the stop of the notification, and it is possible to improve the safety of the moving body.

(4) The control device according to any one of (1) to (3), in which
the notification is audio notification, and
the notification control unit is configured to:
perform the audio notification and visual notification to the user of the moving body when the obstacle is detected; and
stop only the audio notification among the audio notification and the visual notification in response to the notification stop input.

According to (4), in a case where the notification stop input is received, when the distance to the obstacle is far, the audio notification is stopped and only the visual notification is performed, and thus it is possible to visually attract the attention of the user while reducing the annoyance of the user due to the audio output.

(5) The control device according to any one of (1) to (4), in which
the notification control unit is configured to cancel the stop of the notification, in at least one of a case where a traveling direction of the moving body is switched and a case where a notification stop cancellation input is received from the user of the moving body.

According to (5), the safety of the moving body is improved by canceling the stop of the notification according to a movement state of the moving body or an input of the user.

(6) The control device according to any one of (1) to (5), in which
the notification control unit is configured to receive the notification stop input during execution of the movement control and is configured not to stop the notification when the distance satisfies the predetermined condition.

According to (6), when the distance to the obstacle satisfies the predetermined condition, the notification is not stopped, and thus the safety of the moving body can be improved.

(7) The control device according to any one of (1) to (6), in which
the notification control unit is configured to receive the notification stop input and stop the notification before execution of the movement control, and then cancel the stop of the notification when the movement control is executed and the distance satisfies the predetermined condition.

According to (7), even when the notification is once stopped and the distance to the obstacle satisfies the predetermined condition, the stop of the notification is canceled, and thus the safety and usability of the moving body are improved.

(8) A control method performed by a processor of a control device, including:
perform movement control for moving a moving body to a target movement position;
detect an obstacle in surroundings of the moving body.
perform notification to a user of the moving body when the obstacle is detected, in which
the movement control is control for moving the moving body at a first speed or less, and
the control method further comprises:
stopping the notification in response to a notification stop input from the user of the moving body,
canceling the stop of the notification when a movement speed of the moving body is equal to or higher than a second speed, and
during execution of the movement control, canceling the stop of the notification when a distance between the moving body and the obstacle satisfies a predetermined condition, and continuing the stop of the notification when the distance does not satisfy the predetermined condition.

According to (8), even during the movement control in which the stop of the notification is not canceled based on the movement speed, it is possible to perform appropriate notification according to the distance between the moving body and the obstacle, and it is possible to improve both the safety and usability of the vehicle by appropriately switching between canceling and continuing the stop of the notification.

(9) A non-transitory computer-readable recording medium that stores a control program for causing a processor of a control device to execute a process, the process including:
performing movement control for moving a moving body to a target movement position;
detecting an obstacle in surroundings of the moving body; and
performing notification to a user of the moving body when the obstacle is detected, in which
the movement control is control for moving the moving body at a first speed or less, and
the process further includes:
stopping the notification in response to a notification stop input from the user of the moving body,
canceling the stop of the notification when a movement speed of the moving body is equal to or higher than a second speed, and
during execution of the movement control, canceling the stop of the notification when a distance between the moving body and the obstacle satisfies a predetermined condition, and continuing the stop of the notification when the distance does not satisfy the predetermined condition.

According to (9), even during the movement control in which the stop of the notification is not canceled based on the movement speed, it is possible to perform appropriate notification according to the distance between the moving body and the obstacle, and it is possible to improve both the safety and usability of the vehicle by appropriately switching between canceling and continuing the stop of the notification.

The invention claimed is:

1. A control device comprising circuitry configured to:
perform movement control for moving a moving body to a target movement position;
detect an obstacle, which is an object that interferes with an immediate path in which the moving body travels within a certain period of time, in surroundings of the moving body; and
perform notification to a user of the moving body when the obstacle is detected, wherein
the movement control is control for moving the moving body at a first speed or less, and
the circuitry is configured to:
stop the notification in response to a notification stop input from the user of the moving body;
cancel the stop of the notification when a movement speed of the moving body is equal to or higher than a second speed; and
during execution of the movement control, cancel the stop of the notification when a distance between the moving body and the obstacle satisfies a predetermined condition, and continue the stop of the notification when the distance does not satisfy the predetermined condition.

2. The control device according to claim 1, wherein the predetermined condition is that the distance is equal to or less than a predetermined distance.

3. The control device according to claim 1, wherein the predetermined condition is a condition based on an amount of change in the distance.

4. The control device according to claim 1, wherein the notification is audio notification, and
the circuitry is configured to:
perform the audio notification and visual notification to the user of the moving body when the obstacle is detected; and
stop only the audio notification among the audio notification and the visual notification in response to the notification stop input.

5. The control device according to claim 1, wherein the circuitry is configured to cancel the stop of the notification, in at least one of a case where a traveling direction of the moving body is switched and a case where a notification stop cancellation input is received from the user of the moving body.

6. The control device according to claim 1, wherein the circuitry is configured to receive the notification stop input during execution of the movement control and is configured not to stop the notification when the distance satisfies the predetermined condition.

7. The control device according to claim 1, wherein the circuitry is configured to receive the notification stop input and stop the notification before execution of the movement control, and cancel the stop of the notification when the movement control is executed and the distance satisfies the predetermined condition.

8. The control device according to claim 1, wherein the obstacle is the object that interferes with the immediate path in which the moving body is being controlled to autonomously exit or autonomously park.

9. A control method performed by a processor of a control device, comprising:
performing movement control for moving a moving body to a target movement position,
detecting an obstacle, which is an object that interferes with an immediate path in which the moving body travels within a certain period of time, in surroundings of the moving body,
performing notification to a user of the moving body when the obstacle is detected, wherein
the movement control is control for moving the moving body at a first speed or less, and
the control method further comprising:
stopping the notification in response to a notification stop input from the user of the moving body;
canceling the stop of the notification when a movement speed of the moving body is equal to or higher than a second speed; and
during execution of the movement control, canceling the stop of the notification when a distance between the moving body and the obstacle satisfies a predetermined condition, and continuing the stop of the notification when the distance does not satisfy the predetermined condition.

10. A non-transitory computer-readable recording medium that stores a control program for causing a processor of a control device to execute a process, the process comprising:
performing movement control for moving a moving body to a target movement position,
detecting an obstacle, which is an object that interferes with an immediate path in which the moving body travels within a certain period of time, in surroundings of the moving body,
performing notification to a user of the moving body when the obstacle is detected, wherein
the movement control is control for moving the moving body at a first speed or less, and
the process further comprises:
stopping the notification in response to a notification stop input from the user of the moving body;
canceling the stop of the notification when a movement speed of the moving body is equal to or higher than a second speed; and
during execution of the movement control, canceling the stop of the notification when a distance between the moving body and the obstacle satisfies a predetermined condition, and continuing the stop of the notification when the distance does not satisfy the predetermined condition.

* * * * *